3,048,567
METHOD FOR PREPARATION OF SUPERPOLY-
AMIDES SUITABLE FOR FORMING HOLLOW
PRODUCTS AND THE HOLLOW PRODUCTS SO
PRODUCED
Johann Friedrich Kohlwey, Velp (Gld.), Arnhem, Netherlands, assignor to N.V. Onderzoekingsinstituut Research, Arnhem, Netherlands, a corporation of the Netherlands
Filed Sept. 4, 1958, Ser. No. 759,040
Claims priority, application Netherlands July 9, 1954
4 Claims. (Cl. 260—78)

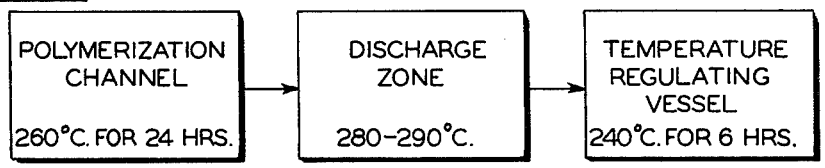
Fig. 1 (INTRINSIC VISCOSITY: 1.8)
| POLYMERIZATION CHANNEL | DISCHARGE ZONE | TEMPERATURE REGULATING VESSEL |
|---|---|---|
| 260°C. FOR 24 HRS. | 280–290°C. | 240°C. FOR 6 HRS. |
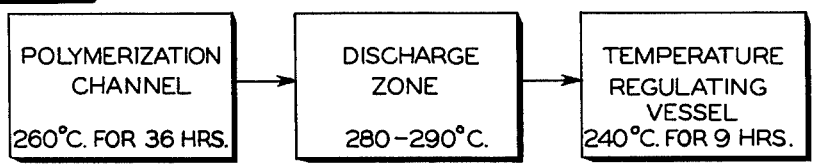
Fig. 2 (INTRINSIC VISCOSITY: 3.0)
| POLYMERIZATION CHANNEL | DISCHARGE ZONE | TEMPERATURE REGULATING VESSEL |
|---|---|---|
| 260°C. FOR 36 HRS. | 280–290°C. | 240°C. FOR 9 HRS. |
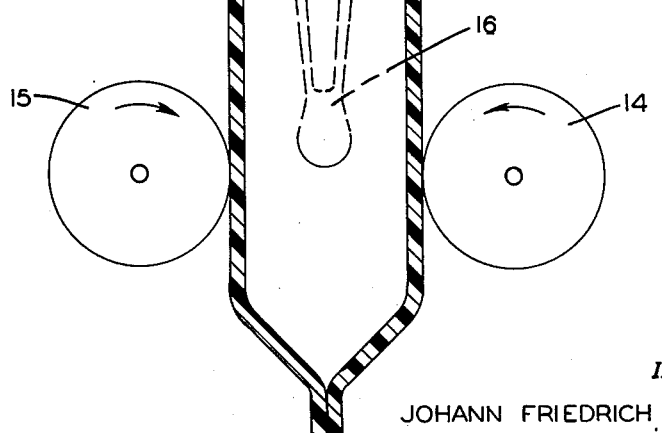
Fig. 3
INVENTOR.
JOHANN FRIEDRICH KOHLWEY
BY Albin F. Knight
ATTORNEY

United States Patent Office 3,048,567
Patented Aug. 7, 1962

The present application is a continuation-in-part of application Serial No. 520,900, filed July 8, 1955, now abandoned.

This invention relates to the preparation of high molecular weight superpolyamides suitable for forming hollow products and to the hollow products manufactured therefrom. More particularly, the invention relates to products derived from the polymerization of $\epsilon$-caprolactam and aminocaproic acid as the initial monomeric compounds. Throughout the specification and claims where the expression "caprolactam" is employed it is intended to cover both of the aforementioned monomers.

It is known that hollow products, e.g. bottles, sausage casings, and the like can be made of thermoplastic substances having a wide melting range, such as polyethylenes. For this purpose the thermoplastic material is melted, transported and metered in an extrusion device. This extrusion device has an extrusion head provided with a circumferential slot and is equipped with a blower. The molten thermoplastic material is extruded through said slot and forms a hollow body which immediately thereafter, while still hot, is given the required form or shape in a mold by blowing the same with gas under pressure.

Up to the present time, however, attempts to form hollow products from superpolyamides made from caprolactam as the starting material, have proved unsuccessful, because this material was not sufficiently form-retentive. In other words, it could not be shaped by blowing without the aid of a mold.

One of the principal objects of this invention involves a new and improved method for manufacturing hollow articles by means of extrusion and blow molding in free space without the use of a mold.

A further object of the invention is to provide new and improved hollow products that are prepared by extrusion of high molecular weight linear polycondensation products obtained from caprolactam.

Other objects and advantages of this invention will become apparent by reference to the accompanying drawings wherein FIGURES 1 and 2 are flow sheets showing preferred temperatures and treating times in the several critical zones. In each of these figures the intrinsic viscosity is shown and is critical to successfully form the hollow products.

FIGURE 3 is a schematic drawing of the hollow product as it is blow-molded in free space from a normal type extruder having an extruder head provided with a circular slit. The dashed outline shows the unsatisfactory shape of the product when the intrinsic viscosity is not within the critical range.

Referring now more particularly to the drawings, the method according to the invention is characterized in that the caprolactam is polymerized in the presence of a stabilizer to superpolyamides having an intrinsic viscosity of 1.7–3.5 and after washing contains less than 4% of low molecular weight water-soluble constituents. Preferably, the intrinsic viscosity is above 2.0, but in FIGURE 1, where the intrinsic viscosity is 1.8, the caprolactam is polymerized in a polymerization channel at 260° C. for about twenty-four hours. It then passes through a discharge zone maintained at a temperature of 280° C.–290° C. Such a discharge zone is shown in U.S. Patent No. 2,735,839 (see numeral 9). Thereafter the polymer passes through a temperature regulating vessel at 240° C. for about six hours.

In FIGURE 2, where the intrinsic viscosity is 3.0, the caprolactam is polymerized at 260° C. for thirty-six hours in the polymerization channel. It then passes through the discharge zone at 280° C.–290° C., and thence to a temperature regulating vessel maintained at 240° C. for nine hours.

In carrying out the polymerization various stabilizers may be employed, and it has been found in practice that phosphoric acid in particular, or acetic acid is very suitable.

In order to obtain a higher viscosity than is usual, the polymer goes into the vertical part of the column (discharge zone 9 of Patent 2,735,839) containing less than the normal amount of water. The temperature of this discharge zone is highly critical and should be maintained above 280° C. as this is about the last place where the water can disappear. When this is done, an intrinsic viscosity above 1.7 is realized which renders it suitable for the purposes of the present invention.

The superpolyamide product formed from caprolactam has a fairly high content of low molecular weight water-soluble constituents. Therefore, before extruding to form hollow products it is necessary to wash these products to remove these water-soluble constituents therefrom. It is preferable that the superpolyamides, after washing should contain less than 3% or 4% low molecular weight water-soluble constituents.

Referring now to FIGURE 3, the extruder proper (not shown) is of conventional form and is provided with an extruder head 10 having a circular slit 11 formed therein. Air, under pressure, is supplied through conduit 12, and forces the superpolyamide through the slit to form a hollow product 13, which is guided by rollers 14 and 15. The air pressure is regulated so that it blow molds the hollow article in free space to form a cylindrical tube, and the intrinsic viscosity is such that this form can be controlled accurately. If the intrinsic viscosity is not in the proper range, then if the gas pressure is too great, it would cause the hollow article to burst because the walls thereof decrease at some distance from the extrusion device. If, on the other hand, the pressure is reduced, the walls tend to form a cone with a globular drop 16 at the end, as shown in dashed lines in FIGURE 3.

This invention also comprises a method for the manufacture of hollow plastic products in which superpolyamides which have been prepared according to the method of the present invention are formed into such products in otherwise known manner, for example, as shown in numerous U.S. patents, to Plax Corporation, of which Bailey et al. U.S. Patent No. 2,529,897 may be mentioned merely by way of example.

While specific examples of preferred methods embodying the present invention have been described above, it will be apparent that many changes and modifications may be made in the methods of procedure recited without departing from the true spirit of the invention. It will therefore be understood that the disclosure set forth above is intended to be illustrative only, and is not intended to limit the scope of the invention.

What is claimed is:
1. A method for the preparation of a superpolyamide suitable for forming hollow articles therefrom, which comprises polymerizing caprolactam in the presence of a stabilizer selected from the group consisting of phosphoric acid and acetic acid to a superpolyamide having an intrinsic viscosity from 1.8 to 3.5 by heating the capro- lactam to about 260° C. for a sufficient time in a polymerization zone, increasing the temperature in a discharge zone to above 280° C. to stabilize the intrinsic viscosity at above 1.7, passing the polymer through a temperature-regulating zone for several hours at a temperature of about 240° C., and finally washing the product until it contains less than 4.0% by weight of water-soluble content, whereby the polymer may be melted, extruded, and blow-molded in free space to form hollow articles therefrom.

2. A method for the preparation of a superpolyamide suitable for forming hollow articles therefrom, which comprises polymerizing caprolactam in the presence of a stabilizer selected from the group consisting of phosphoric acid and acetic acid to a superpolyamide having an intrinsic viscosity from 1.8 to 3.5 by heating the caprolactam 260° C. for a sufficient time in a polymerization zone, increasing the temperature in a discharge zone to above 280° C. to stabilize the intrinsic viscosity at above 2.0, passing the polymer through a temperature-regulating zone for several hours at a temperature of about 240° C., and finally washing the product until it contains less than 4.0% by weight of water-soluble content, whereby the polymer may be melted, extruded, and blow-molded in free space to form hollow articles therefrom.

3. A method for the preparation of a superpolyamide suitable for forming hollow articles therefrom, which comprises polymerizing caprolactam in the presence of a stabilizer selected from the group consisting of phosphoric acid and acetic acid to a superpolyamide having an intrinsic viscosity from 1.8 to 3.5 by heating the caprolactam to about 260° C. for twenty-four to thirty-six hours in a polymerization zone, raising the temperature near the discharge end of the polymerization zone above 280° C. to effect an intrinsic viscosity above 1.7, passing the polymer through a temperature-regulating zone for several hours at a temperature of about 240° C., and finally washing the product until it contains less than 4.0% by weight of water-soluble content, whereby the polymer may be melted, extruded, and blow-molded in free space to form hollow articles therefrom.

4. A method for the preparation of a superpolyamide suitable for forming hollow articles therefrom, which comprises polymerizing caprolactam in the presence of a stabilizer selected from the group consisting of phosphoric acid and acetic acid to a superpolyamide having an intrinsic viscosity from 1.8 to 3.5, by heating the caprolactam to about 260° C. for twenty-four to thirty-six hours in a polymerization zone, increasing this temperature to about 280° C. in a discharge zone to effect an intrinsic viscosity above 1.7, passing the polymer through a temperature-regulating zone at about 240° C. for six to nine hours, and finally washing the product until it contains less than 4.0% by weight of water-soluble content, whereby the polymer may be melted, extruded, and blow-molded in free space to form hollow articles therefrom.

References Cited in the file of this patent

UNITED STATES PATENTS

| | | |
|---|---|---|
| 2,241,321 | Schlack | May 6, 1941 |
| 2,288,454 | Hobson | June 30, 1942 |
| 2,307,817 | Austin | Jan. 12, 1943 |
| 2,562,523 | Brunet | July 31, 1951 |
| 2,577,621 | May et al. | Dec. 4, 1951 |
| 2,585,163 | Pease et al. | Feb. 12, 1952 |
| 2,706,308 | Lorenz | Apr. 19, 1955 |
| 2,735,839 | Schrenk | Feb. 21, 1956 |
| 2,810,934 | Bailey | Oct. 29, 1957 |

FOREIGN PATENTS

| | | |
|---|---|---|
| 248,484 | Switzerland | Mar. 16, 1948 |